United States Patent [19]

Smith et al.

[11] Patent Number: 4,679,542
[45] Date of Patent: Jul. 14, 1987

[54] FAN-PLENUM CONFIGURATION

[75] Inventors: Donald P. Smith, 4530 Woodfin Dr., Dallas, Tex. 75220; Virgil L. Archer, Dallas, Tex.

[73] Assignee: Donald P. Smith, Dallas, Tex.

[21] Appl. No.: 815,666

[22] Filed: Dec. 31, 1985

Related U.S. Application Data

[63] Continuation of Ser. No. 359,921, Mar. 19, 1982, abandoned.

[51] Int. Cl.⁴ .................................................. A21B 1/00
[52] U.S. Cl. ....................................... 126/21 A; 99/447
[58] Field of Search ................. 219/388, 400; 34/155, 34/160, 20, 212; 126/21 A; 432/8, 59; 99/447

[56] References Cited

U.S. PATENT DOCUMENTS

| | | | |
|---|---|---|---|
| 2,804,697 | 9/1957 | Coffaro | 34/212 X |
| 3,214,845 | 11/1965 | Huffman | 34/160 X |
| 3,739,491 | 6/1973 | Creapo et al. | 34/156 |
| 3,884,213 | 5/1975 | Smith | 126/21 A |
| 4,089,322 | 5/1978 | Guibert | 219/400 X |
| 4,094,077 | 6/1978 | Schrader et al. | 34/155 |
| 4,123,917 | 11/1978 | Curtis et al. | 34/20 X |
| 4,127,945 | 12/1978 | Nöthen et al. | 34/155 X |
| 4,153,236 | 5/1979 | Elhaus | 34/160 X |
| 4,154,861 | 5/1979 | Smith | 126/21 A X |
| 4,197,659 | 4/1980 | Brinkhaus et al. | 34/155 |
| 4,235,023 | 11/1980 | Best | 34/212 X |
| 4,327,279 | 4/1982 | Guibert, II | 126/21 A |

FOREIGN PATENT DOCUMENTS

| | | | |
|---|---|---|---|
| 1074515 | 10/1954 | France | 34/160 |
| 768878 | 2/1957 | United Kingdom | 34/156 |

*Primary Examiner*—Larry Jones
*Attorney, Agent, or Firm*—Crutsinger & Booth

[57] ABSTRACT

An impingement device (10) for preparing food product comprises an enclosure (12) having a conveyor (18) received therethrough for conveying food product through the enclosure (12). Positioned within the enclosure (12) and about the conveyor (18) portion therein are ducts (36) for impinging gas against the food product, a plenum (48) connected to the ducts (36) for supplying gas to the ducts (36), and an impeller assembly (44) for recirculating the gas within the enclosure (12). A heating source (40) or cooling source (340) is provided within a chamber (14) on the opposite side of the plenum (48) from the ducts and controls (26) are provided for regulating the temperature of the heat or cooling source. The plenum (48) is spaced inwardly from the walls of the enclosure (12) to provide return flow around the plenum.

18 Claims, 11 Drawing Figures

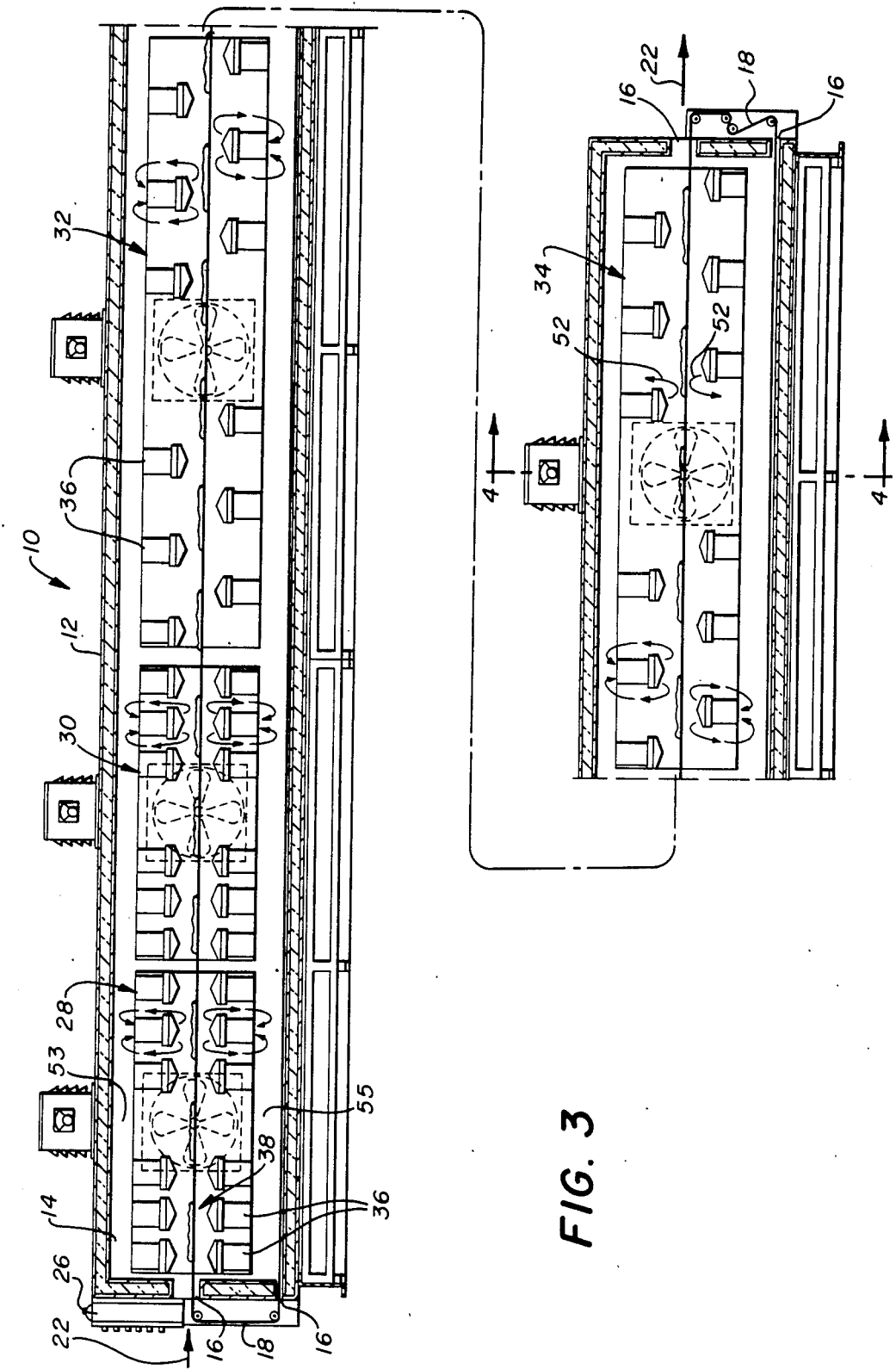

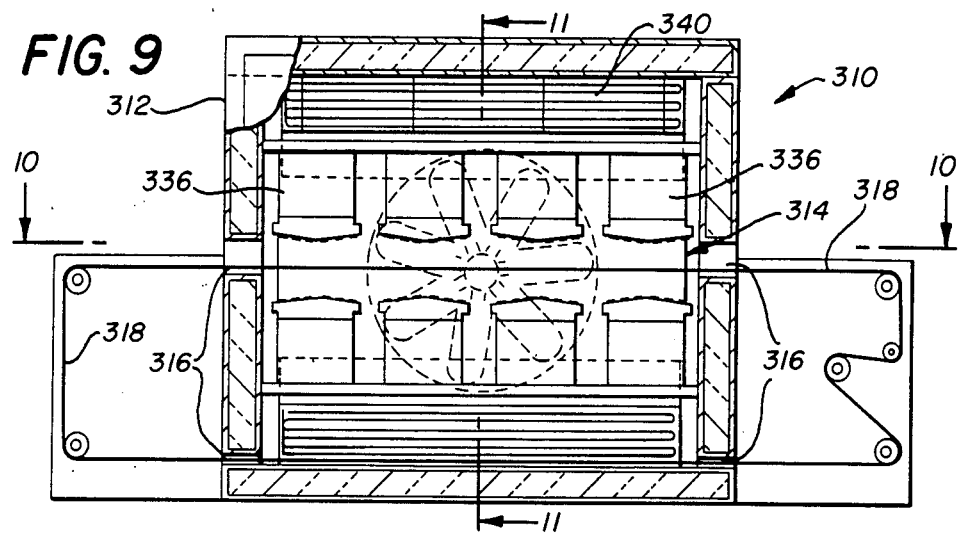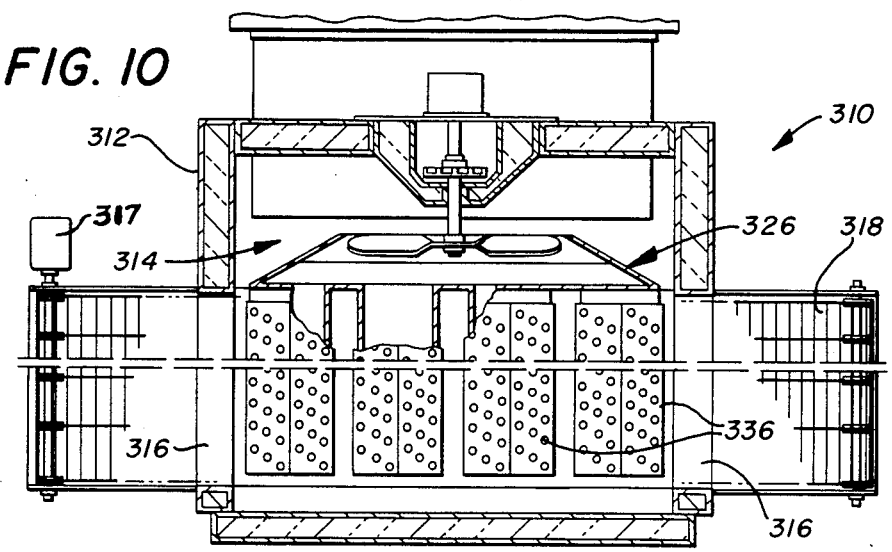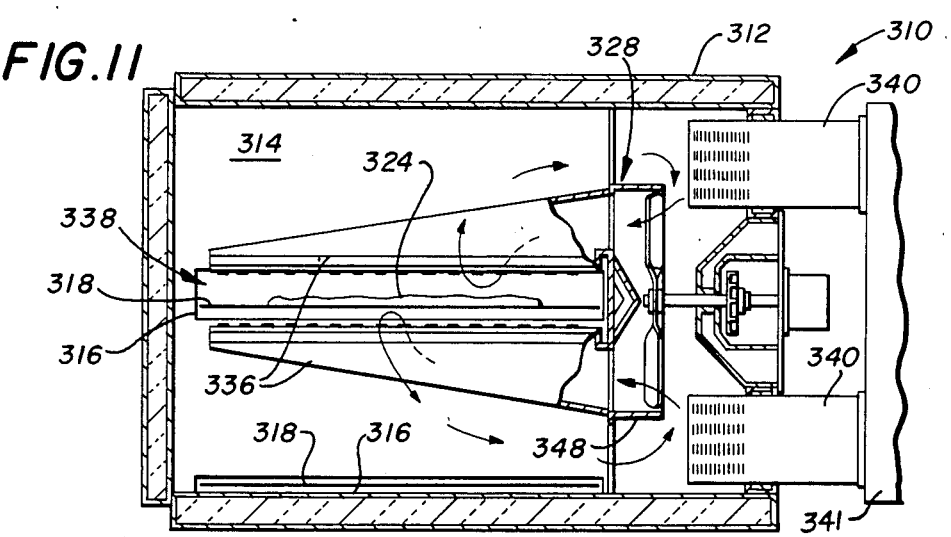

FAN-PLENUM CONFIGURATION

BACKGROUND OF INVENTION

This application is a continuation of application Ser. No. 06/359,921 filed Mar. 19, 1982, entitled FAN-PLENTUM CONFIGURATION, now abandoned.

TECHNICAL FIELD

Disclosed is impingement food heating and cooling devices and fan-plenum air flow configurations therefor.

BACKGROUND ART

This application is related to the subsequent improvements disclosed in the joint application of Michael C. Henke, Gordon D. Bell, Don P. Smith, and Virgil L. Archer entitled "Impingement Oven," Ser. No. 386,609, filed June 9, 1982

In impingement heating and cooling devices for processing foods a jet of either heated or cooled gas impinges upon the surface of the food to sweep away the boundary layer and increase the rate of heat transfer between the gas and the food product. Cooking and cooling devices of this type have proven quite satisfactory and have been combined with other types of cooking apparatus such as microwaves to produce unique combinations of cooking devices. Exemplary prior art impingement devices are found in prior art U.S. Pat. Nos. 3,884,213 and 4,154,861.

In impingement devices used to process foods, the control of the flow of the gases presents problems which are not found in any other type of heating or cooling device. It is apparent that the volume and velocity of the gases contacting the food being processed determine the cooking or cooling rate. It is therefore critical to assure that the gas flow is within the specifications necessary to properly cook or cool the food to insure that the food product is either completely cooked or cooled as the case may be. In addition to the problems of controlling the rate and volume of the flow of the impinging gases in devices of this type, other unique problems are present relating to the flow of these gases which are not present in any other type of heating or cooling device. These problems relate to the distribution of the heating or cooling gas jets across the product to insure that uniform cooking or cooling occurs throughout the entire product. This critical requirement of food processing impingement devices requires that the various jets contacting a food product at a given time operate in a fixed relationship to each other even though variations in the supply flow rate occur. In addition, it has been found that the return flow path of the gases from the impingement jets affects the performance of the oven. In the past, it was believed that the most efficient configuration for removing discharged impingement gases was to draft the gases in a direction transverse to the direction of the flow of the gases in impingement jets, at least, in the area of the food product. Thus, impingement gases would flow from the nozzle and impinge upon the product and after contacting the product would move across the product in a direction transverse the direction of flow of the impingement jets. Although this configuration performed satisfactorily it was found that contrary to what would be expected that the efficiency and performance of the system could be improved by discharging the impingement gases in a direction reverse of the direction of the impingement jets. Thus, it was found by removing as much as possible of the transverse draft of the impingement gases and by causing a discharge in a direction opposite to the direction of the flow of the impingement jets that surprising improvement in the operating characteristics occurred. It is believed that this improved configuration reduced turbulence and increased the uniformity of heating or cooling throughout the device.

DISCLOSURE OF THE INVENTION

The present invention provides an improved gas flow jet type impingement food processing device. The invention has application in both an impingement heating device such as ovens and an impingement cooling device such as cryofreezing units. The invention also has application in an impingement device combined with other types of processing apparatus such as microwave, convection and radiant ovens. One aspect of the invention describes a fan-plenum configuration which produces an improved distribution and supply of gases to the nozzles forming the impingement jets and thus improving the performance of the device. In another aspect of the invention, the return flow path is provided for the impingement gases. This path allows the gasses to move in a direction opposite to the flow in the impingement jets and away from the food product. These and other aspects of the present invention will become better understood by considering the drawings and detailed description contained in this application.

BRIEF DESCRIPTION OF THE DRAWINGS

The following drawings are included to illustrate the various aspects of the present invention:

FIG. 3 is a section taken on line 3—3 of FIG. 2 looking in the direction of the arrows;

FIG. 9 is a front elevation of a cooling impingement device of the present invention;

FIG. 10 is a horizontal section of the device taken on line 10—10 of FIG. 9 looking in the direction of the arrows; and FIG. 11 is a vertical sectional of the device taken on line 11—11 of FIG. 9 looking in the direction of the arrows.

Figure 1:
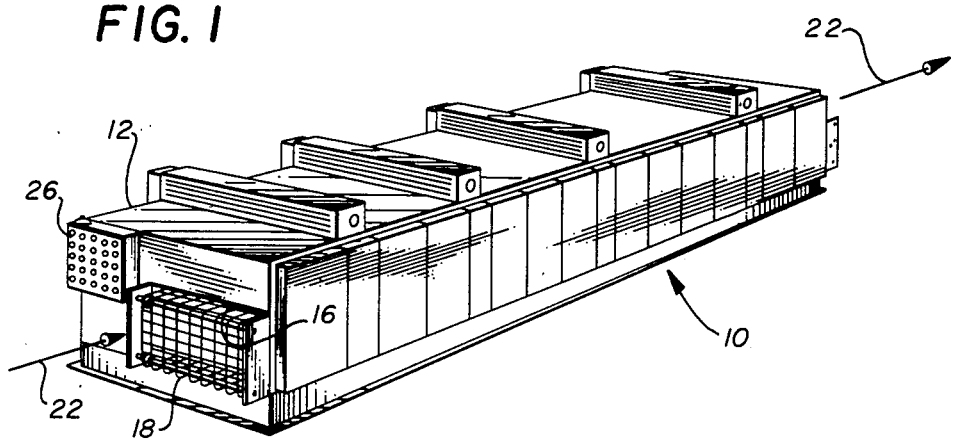
FIG. 1 is a perspective view of a commercial impingement oven incorporating the present invention.

The drawings and the accompanying description when considered together and read fairly provide a sufficient description for a person of ordinary skill in the art to make and use the present invention.

DETAILED DESCRIPTION

Referring now to the drawings wherein like reference characters are used throughout the various views to indicate like or corresponding parts, there is shown in FIGS. 1-5 an impingement device for food products. For purposes of description, the device is designated by reference numeral 10. The embodiment illustrated in FIGS. 1-5 is a commercial type and utilizes an endless conveyor to move food products therethrough. The device contains a plurality of upper and lower impingement jets directed toward the top and the bottom of the food product as it moves through the oven. Preferably, the conveyor is of a chain mesh material to allow impingement jets to pass therethrough. The present invention is illustrated as a commercial oven but also has application to other types of ovens and in food cooling devices. The description of the present invention with regard to the particular type of ovens illustrated in the Figures is by way of example and is not intended by implication to limit the invention to use in this particular type of oven. It should be appreciated that the present invention, for example, has application to smaller ovens such as those used in the home wherein an endless conveyor does not extend through the oven.

In the embodiment of FIGS. 1-5, the device 10 comprises an insulated enclosure 12. Enclosure 12 can be constructed in any suitable manner well known in the food processing industry to produce an enclosure which forms an insulated chamber. Enclosure 12 is an elongated structure with openings 16 in the ends thereof. An endless conveyor 18 extends through these openings 16. The conveyor 18 is conventionally supported and driven by a motor (not shown) in the figures of this embodiment, but see motor 317 of FIG. 10 such that the food supporting surface 20 of the conveyor is moved in the direction of arrow 22. In operation, food products 24 can be continuously moved through the enclosure 12 in the direction of arrow 22. As will be described in more detail, food products 24 are carried by conveyor 18 past a plurality of impingement jets to properly cook the food products. A control panel 26 is provided with control means for regulating the speed and operation of conveyor 18 and the temperature of a heater assembly for the air of the impingement jets within enclosure 12.

As can be seen in FIG. 3, the products 24 are moved by the conveyor 18 through the enclosure 12 and pass through successive impingement apparatus assemblies 28, 30, 32 and 34, respectively. Each of the impingement assemblies has upper and lower impingement ducts 36. Ducts 36 are positioned in close proximity to the conveyor 18 and define a cooking area or zone 38 between the upper and lower ducts 36. By varying the location and number of these impingement ducts 36 in each of the cooking areas or zones 38 the cooking rate can be varied.

Figure 4:
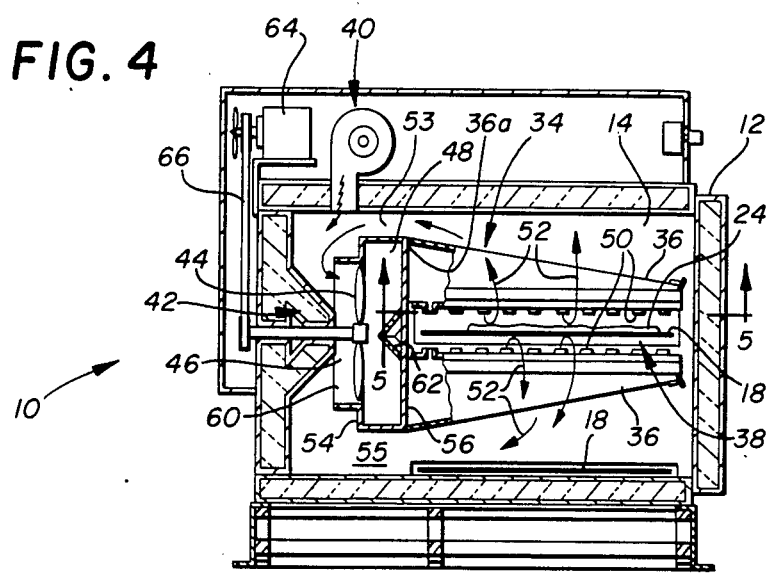
FIG. 4 is a section taken along line 4—4 looking in the direction of the arrows.

The basic construction of each of the impingement assemblies 28-34 is similar in overall construction and configuration. The impingement assemblies 28-34 differ in the position in spacing of the respective impingement ducts 36. In FIG. 4, impingement assembly 34 is shown in section. It should be understood, of course, that the description of impingement assembly 34 is typical for the other impingement assemblies except as noted herein.

Impingement assembly 34 comprises the following basic elements which cooperate together to supply an even and continuous supply of heated air to the product 24 as the product is moved through the cooking area 38 by conveyor 18: a heater assembly 40, a tapering shroud 42, a driven impeller 44, a collar 46, a plenum assembly 48, and a plurality of tapered impingement ducts 36 defining a cooking area 38 therebetween. In operation, tapering shroud 42 cooperates with collar 46 to direct return air into the impeller 44. Impeller 44 in turn moves the return air into the plenum assembly 48. Plenum 48 acts as a manifold to properly distribute air into the various impingement ducts 36. Air in the impingement ducts exits through nozzles 50 and is directed against the upper and lower surfaces of the products 24.

Figure 5:
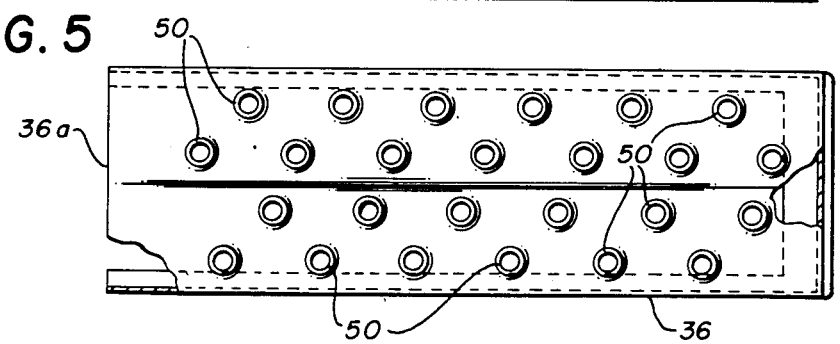
FIG. 5 is a partial sectional view taken along line 5—5 of FIG. 4 and looking in the direction of the arrows.

One embodiment of an impingement duct 36 is shown in FIGS. 4 and 5. As is illustrated, the duct 36 is greater in cross sectional area at the end 36A adjacent to the plenum 48. The cross sectional area of the duct 36 decreases along the length of the duct as the duct extends away from the end 36A. This configuration provides an even pressure distribution of the air along the length of the duct. Duct 36 has a plurality of nozzles or perforations 50 which are arranged in the pattern illustrated in FIG. 5. The gas supplied to the interior of the duct 36 exits the perforations 50 and is directed into the cooking area 38 in streams or jets as illustrated by arrows 52. These ducts 36 can be embodied as shown and described in U.S. Pat. No. 4,154,861 and operate as described therein to provide a plurality of spaced discrete streams of gas or impingement jets that contact and cook the food. These jets each contact a discrete area on the food product and will not be substantially diffused prior to impingement against the surface of the food product.

Figure 2:
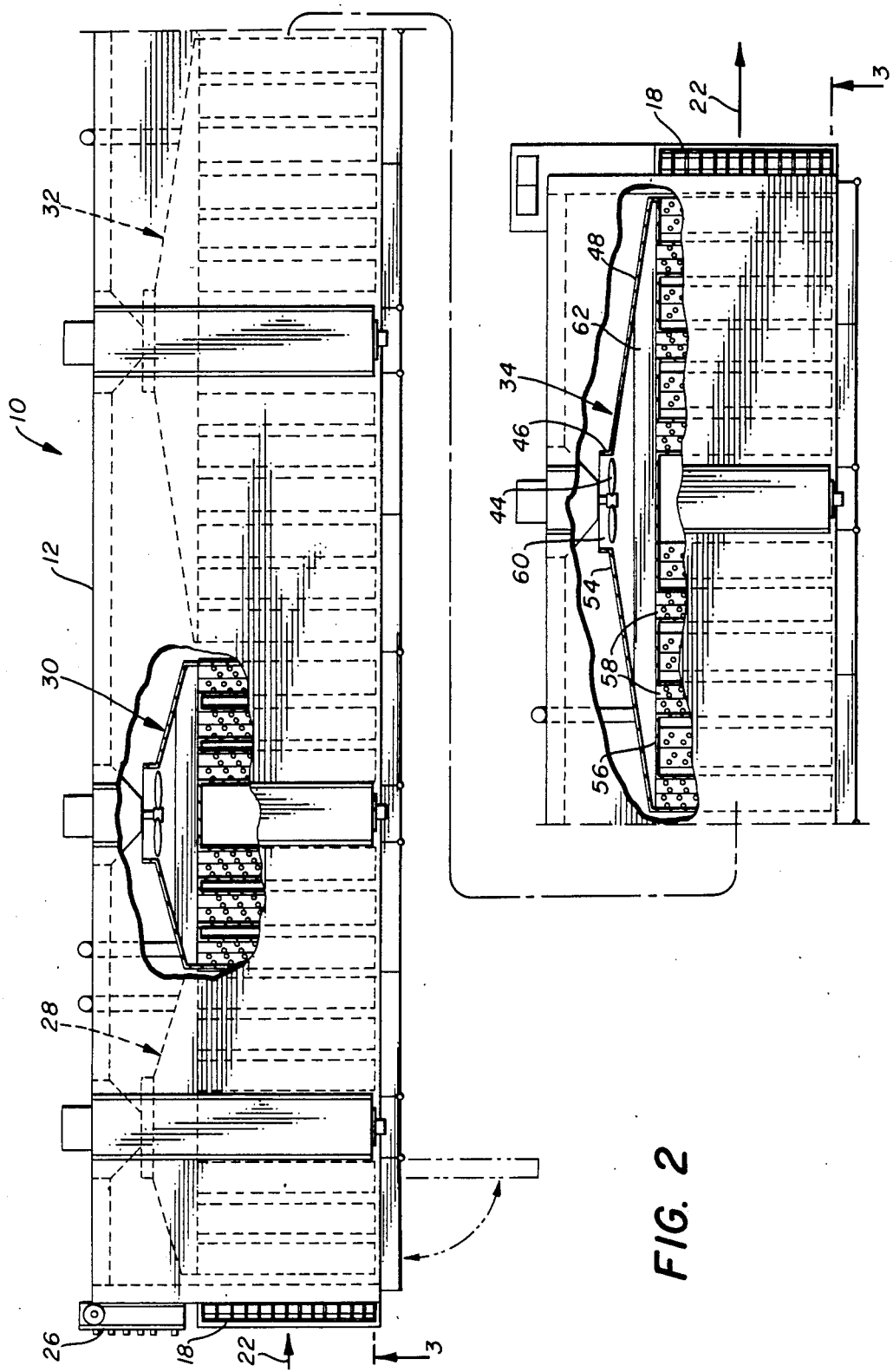
FIG. 2 is a plan view partly in section of the oven illustrated in FIG. 1.

As is shown in FIG. 4, impingement ducts 36 are mounted on and supported by the plenum assembly 48. Details of the configuration of the plenum assembly is shown in FIGS. 2, 3 and 4. The plenum assembly is constructed from a suitable sheet of material, such as stainless steel, welded, riveted or otherwise fastened together to form a plenum chamber. Plenum assembly 48 is positioned to extend above and below said conveyor 18. Plenum assembly 48 is spaced inwardly from the walls of said enclosure to provide a return flow path for air through spaces 53 and 55 located respectively above and below the plenum. Backwall 54 tapers as shown in FIG. 2 to direct air outward to the impingement ducts 36 positioned across the width of the plenum. The frontwall 56 has a plurality of rectangular openings 58 through which air moves into the impingement ducts 36. In the embodiment shown in FIGS. 1-5, a collar 46 surrounds an opening 60 in the backwall 54 of the plenum 48. This collar is of a size to closely surround the path of impeller 44 without interfering with its movement. The collar 46 may be shaped to reduce turbulence and is small enough to cooperate with the impeller 44 to increase the efficiency and distribution of air into the plenum 48. A V-shaped deflector 62 extends horizontally across the center of the plenum 48. This deflector 62 cooperates with the impeller 44 to direct air in a direction above and below the deflector 62 to improve the distribution characteristics of the plenum, reduce turbulence, and supply air to the individual impingement ducts 36 through openings 58.

As can be seen in FIG. 4, tapering shroud 42 is positioned at the rear of impeller 44. This tapering shroud can be either frusto, conical or pyramid shaped to guide the return air into the collar 46. In addition, because the return air must change direction as it enters the collar 46 and impeller 44, tapering shroud 42 cooperates to eliminate dead spaces behind the impeller and forms an annular opening to direct the gas into the impeller.

Impeller 44 is shown suitably connected and driven by motor 64 through an endless belt 66. The motor 64 of course could be axial with the shaft of impeller 44. The shaft of impeller 44 extends through the center of the tapering shroud 42.

In FIG. 4, heater assembly 40 is shown communicating with chamber 14. As is conventional in ovens, this heater assembly 40 is controlled by a thermostat and control circuitry not shown and operates as required to add heat to the return air before it enters the collar impeller area of the enclosure 12. Thus the temperature of the air in the plenum can be controlled by mixing return air with heated air from the heater 40. The heater assembly 40 can be conventional gas or electric type. It should be understood that for purposes of description the improved air flow mechanism of the present invention is disclosed in regard to oven. However, the present invention has application and utility in devices which are used to cool food products. In such instance, the heater 40 would be replaced with a suitable cooling device such as a refrigeration coil or the like to cool the air as it flows through the system. Such devices could be utilized in freezing or cooling food products. It should therefore be understood that the improved flow mechanism of the present invention would likewise have application in the freezing or cooling of foods in an apparatus of this device.

According to a particular feature of the present invention the air flow of the impingement jets and the return air is such that uniform cooking occurs of the product 24 without regard to location across the width of the conveyor 18. It is believed that this uniform cooking is a result of two primarily cooperating aspects of the apparatus of the present invention. The first aspect is a cooperation of the impeller 44 tapering shrouds 42, collar 46, deflector 62 and tapered impingement ducts. These elements of the invention cooperate to provide an even and adequate distribution of flow of return gases into the plenum assembly 48 thus insuring an adequate supply of gases to each of the impingement ducts 36 communicating with the plenum 48. An adequate and uniform distribution of return air to the various inpingement ducts 36 insures a uniform and adequate supply of air for proper cooking throughout the cooking area 38. The adequate and even cooking by the impingement jets is further enhanced by the cooperation of the return path of the discharged gas. As is illustrated in FIGS. 4-5, the flow path of the air from the impingement jets is schematically shown by arrows 52. In FIG. 4, the impingement jets are shown contacting the product 24 to sweep away the boundary layer and cause rapid heat transfer between a product 24 and the air of the impingement jet. Air from the impingement jet moves in a reverse direction after contacting product 24. The return air moves up between the impingement ducts 36 as shown in FIG. 3. By moving the return air in a direction opposite to the vector of the impingement jet, side or transverse drafts are minimized and a uniform cooking occurs across the width of the conveyor 18 in the cooking area 38. It is believed that transverse or side drafts cause variations in cooking rates which can make the heat transfer rate of the particular impingement jets vary with position across the width of product 24 creating undesirable variations in cooking. By providing a suitable subject space between each of the impingement ducts 36, the return path 52 of the discharge air can move up or down, respectively, between the impingement jets and out of the cooking area. The return of these gases in this manner minimizes the affect on the uniformity of cooking.

Return air can move above and below the cooking area, over the plenum assembly 48, past the heater assembly 40 and into the impeller 44 of the tapered shroud 42. Dividing of the return gases above and below the plenum assembly 48 minimizes undesirable transverse drafts in the cooking chamber. This improvement is surprising in that one would not expect that even cooking would result from the movement of the discharged air in a direction opposite to the vector of impingement flow. It would have been assumed that moving the discharge gases in a direction opposite to the direction of the impingement flow would reduce efficiency and interfere with the flow of the impingement jets. In addition, a more even distribution of the air through the impeller 44 is provided by moving the air over both the top and bottom of the plenum. This increases the efficiency of the system by providing short length air return paths from the product to the impeller. Also if the conveyor surface is blocked solid, as when covered cooking pans are used, or when a solid conveyor belt is used, the air from the top and the bottom returns directly to the impeller without passing around the closed conveyor surface systems which return the gases solely to either the top or the bottom of the oven.

It is to be understood, of course, that the illustration of the invention in FIGS. 1-5 is by way of example and that other configurations could be utilized to practice the present invention. For example, alternate embodiments of the present invention are shown in FIGS. 6-11.

Figure 6:
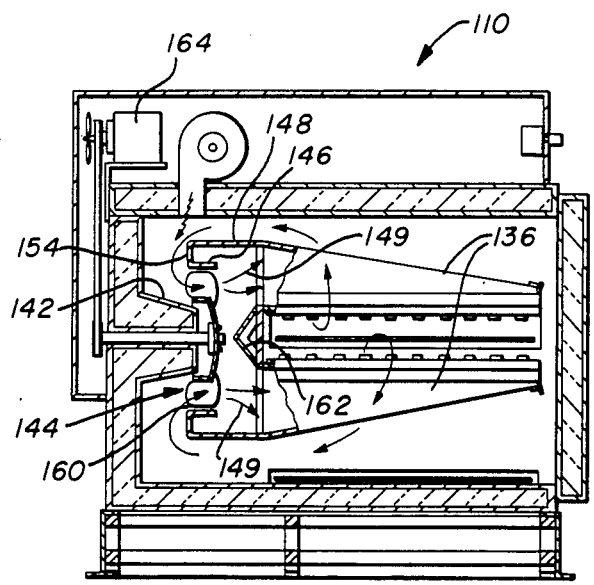
FIG. 6 is a view similar to FIG. 4 showing an alternate configuration of the fan-plenum arrangement.

In FIG. 6 an alternate embodiment of an impingement oven 110 is shown. This embodiment would also have the same general configuration of the oven shown in FIGS. 1-5 and the details of construction of the impeller assembly 144 and plenum assembly 148. In FIG. 6, the backwall 154 of the plenum 148 is provided with an internally directed flange 146 which forms a collar for the impeller 144. This internally turned flange 146 extends completely around the periphery of the rear opening 160 in the plenum assembly 148. Flange 146 can be integrally formed with backwall 154 or can be formed by a separate piece fixed to the backwall 154 in a suitable manner. Flange 146 cooperates with the impeller 144 and tapering shroud 142 to improve the air flow and distribution into the plenum 148.

Figure 7:
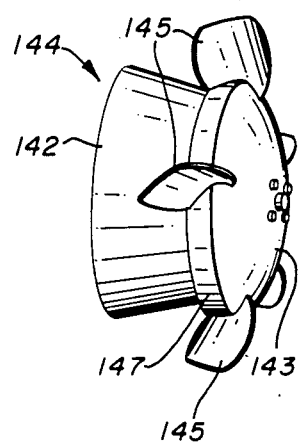
FIG. 7 is a perspective view of the fan illustrated in FIGS. 6 and 8.

The impeller assembly 144 is shown in detail in perspective view in FIG. 7. The tapering shroud 142 is shown frusto conical shaped and the impeller 144 has a central dome shaped portion with impeller blades 145 on the periphery thereof. Impeller assembly 144 is positioned with the concave side of the dome shaped portion 143 facing toward the plenum 148. The dome shaped portion cooperates with and fits around tapering shroud 42 to assist in directing the flow of air into the plenum 148. The central dome shaped portion 143 has a cylindrical skirt 147 on the periphery thereof. The skirt 147 extends parallel to the flange 146 to define an annular space therebetween. This annular space between the skirt 147 and flange 146 is the area through which the blades 145 rotate as they are driven in a circle by the motor 164. The blades 145 are each scoop shaped and provide the unique advantage of causing flow in both the axial and radial direction as shown by arrows 149. This axial and radial flow distributes the air throughout the plenum and cooperates with the shroud 142, flange 146 and a deflector 162 to provide uniform distribution of the air and uniform heat transfer rates throughout the impingement ducts 136.

Figure 8:
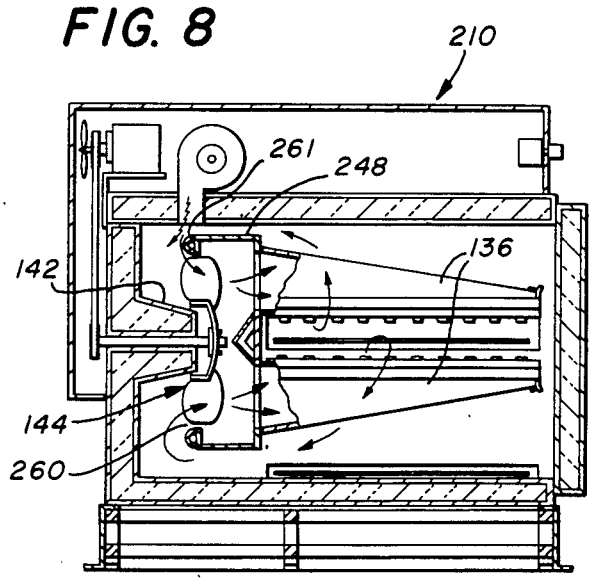
FIG. 8 is a view similar to FIG. 6 showing alternate configuration of the fanplenum arrangement.

In FIG. 8, an oven 210 is illustrated having a plenum assembly 248 with a tapering shroud 142 and impeller assembly 144 identical to the construction illustrated in FIG. 7. In the embodiment of FIG. 8, the plenum 148 has a backwall 154 (not shown) with an opening 260 therein. Fixed around the periphery of the circular opening 260 is a length of tubing 261 positioned as shown in FIG. 8. This tubing 261 is fixed around the edge of the opening 260 by welding fasteners of the like and operates to form a smooth edge around which the returning air flows. This smooth edge around the opening 260 cooperates with the fan to improve the flow of air into the plenum assembly 248.

In FIGS. 9-11, the invention is shown in the embodiment of a cooling device. This cooling device is identified generally by reference 310 and comprises a sealed insulated enclosure 312 forming a chamber 314 therein. Openings 316 provide clearance for an endless conveyor 318 to extend through the chamber 314. The conveyor 318 is suitably driven and controlled as explained in regard to the embodiment of FIGS. 1-5 and is used to move food product through the chamber 314.

A single impingement assembly 328 is mounted within chamber 314. Impingement assembly 328 has a plurality of impingement ducts 336. Impingement assembly 328 and ducts 336 are similar in construction to those shown in FIGS. 1-5. A plurality of refrigeration coils 340 are provided within the chamber 314 in the flow path of the return to the plenum assembly 348. A conventional refrigeration assembly 341 is connected to the cooling coils 340 and is provided with suitable compressors, evaporators and the like to provide cooling for the return air passing across the coils 340. In this manner device 310 can be utilized to cool food products 324 carried by conveyor 318 as it moves through cooking area 338. It is also envisioned that additional cooling could be provided by apparatus not shown to directly inject cooling gases such as nitrogen to the rear of the plenum 348. Thus the improved flow characteristics of the oven of FIGS. 1-5 can be applied to a food cooling device such as shown in FIGS. 9-11. In the cooling device of FIGS. 9-11 the return air flow path can be identical to that shown and described in regard to FIGS. 1-5 even though the air is utilized for cooling rather than cooking.

The various aspects of the present invention have been described in regard to exemplary embodiments incorporating the present invention. In addition, the invention can, for example, be applied to cooking or cooling apparatus without the presence of an endless conveyor extending through a chamber. The improved flow characteristics disclosed in the present invention could have utility and advantage in devices having a sealed enclosure wherein the food product is, for example, placed in the device for a set period of time. In addition, the food product could be moved within the device by a carrousel or oscillating support. It is a envisioned that the food product could be fixed and the impingement apparatus moved to cause a sweep over the surface of the product. In addition, a closed system which combines microwave or other type of food cooking or processing with the apparatus of the present invention could be used.

Thus, having described the present invention it is to be understood, of course, that numerous modifications, alterations and changes can be made in the device by one of ordinary skill in the art without departing from the spirit and scope of the invention as claimed herein.

We claim:
1. An impingement device for processing food products comprising:
    an enclosure defining a chamber for receiving a food product therein,
    means for supporting said food product within the chamber,
    a plurality of duct means mounted in said chamber, nozzles in each of said duct means shaped and spaced to form a plurality of discrete streams of gas each stream vertically impinging upon a discrete area of said food product and diffusing upon contact with said food product, at least one duct means positioned above and one duct means positioned below said food product supporting means for directing gas through said nozzles in said duct means to impinge upon the food product on said supporting means,
    a plenum in said chamber for enclosing a reservoir of gas, said plenum being positioned adjacent an edge of said supporting means and having said duct means connected thereto, said plenum having one side with outlet openings in communication with said duct means and having another side with an inlet opening therein, said plenum being of a size and shape to extend above and below said supporting means and being spaced inwardly from said enclosure whereby a flow path for gas in said chamber is formed both above and below said plenum to allow gas to return to said inlet opening after contacting said food product,
    impeller means positioned in said chamber at said inlet opening for providing a supply of pressurized gas to said plenum from said chamber,
    deflector means in said plenum, said deflector means being shaped and positioned relative to said impeller means to direct gas from said impeller means into said duct means whereby gas is caused to flow through said nozzles in said ducts to impinge vertically upon said food product and once contacting said food product to return around said plenum and to said impeller means by paths which extend above and below said plenum, and means for moving said food product within said chamber relative to said duct means whereby the impingement jets formed by the nozzles of said duct means are moved across the surface of said food product.

2. The food processing device of claim 1 wherein said supporting and moving means comprise a conveyor means mounted within said enclosure for moving said food product within said enclosure whereby the vertically directed impingement jets formed by said ducts move across the surface of said food product, said conveyor means extending generally parallel to said deflector means.

3. The device of claim 1 wherein said duct means are taperd in cross section in a direction away from said plenum.

4. The device of claim 1 additionally comprising a heating means for heating the gases within said enclosure.

5. The device of claim 1 additionally comprising a cooling means for cooling the gases within said chamber.

6. An impingement device for processing food products comprising:
    an enclosure,
    support conveyor means in said enclosure, duct means mounted within said enclosure and being generally vertically aligned with and spaced apart from said support conveyor means for directing air through a plurality of jets in said duct means so as to substantially vertically impinge on the food product to be cooked while said food product is supported on said support coveyor means, a plenum disposed within said enclosure and connected to said duct means to provide said air to said duct means, said plenum having a front portion with a plurality of openings therein in fluid communication with said duct means and having a rear portion with a rear opening therein, a generally annular collar on said rear portion of said plenum disposed around said rear opening, impeller means positioned within said collar for drawing said air into said plenum through said rear opening, a dome shaped central portion on said impeller means, and impeller blades secured about the periphery of said central portion, said blades being scoop shaped and positioned to move air in axial and radial directions, said collar having an annular surface which extends axially relative to said impeller means, said plenenum being spaced inwardly from said enclosure so as to permit the air which has flowed out of said jets to flow above and below said plenum and then through said collar and into the rear portion of said plenum, a shroud having a surface which is in close proximity to the rear of said collar for directing the air into said collar, and means for controlling the temperature of the air in said enclosure.

7. An impingement device for processing food products comprising:

an enclosure having an accessible interior and a generally horizontally disposed passageway therethrough, conveyor means receivable through said passageway and adapted to convey food products through said interior, duct means mounted within said enclosure and being generally vertically aligned with and spaced apart from said conveyor means, said duct means and said conveyor means defining therebetween a food processing chamber, said duct means being further adapted to direct a plurality of jets of temperature controlled air substantially vertically against the surface of said food products as they are conveyed by said conveyor means through said food processing chamber, said duct means and said enclosure defining therebetween a return chamber in communication with said food processing chamber for receiving return air therefrom, a plenum attached to and in communication with said duct means for providing temperature controlled air to said duct means, said plenum having a front portion with a plurality of openings therein in fluid communication with said duct means, said pelnum having a rear portion with a rear opening therein, said plenum being spaced inwardly from said enclosure to form an air path between said plenum and said enclosure to permit air which has flowed from said jets to flow above and velow said plenum, a generally cylindrical collar disposed about said plenum rear opening, impeller means for rapidly drawing air into said plenum, a dome shaped central portion on said impeller means, and impeller blades secured about the periphery of said central portion, said baldes being scoop shaped and positioned to move air in axial and radial directios, deflector means in said plenum, said deflector means being shaped and positioned relative to said impeller means to direct gas from said impeller means into said duct means, said collar having an annular surface extending axially relative to said impeller means, and a shroud having a surface in close proximity to and at least partially rearwardly of said collar for directing the air into said collar, whereby temperature controlled air is forced through said jets into said food processing chamber for impingement on the food conveyed by said conveyor means, the air then being drawn through said return chamber by said impeller means through said collar and said plenum into said duct means.

8. An impingement device for processing food products comprising:

an enclosure defining a chamber for receiving a food product therein, means for supporting a food product within the chamber, a plurality of duct means mounted in said chamber above and below said means supporting a food product and spaced apart longitudinally of said chamber, nozzles in each of said duct means to form discrete streams of gas which will not be diffused prior to substantially vertical impingement against the surface of the food product, at least one duct means each positioned above and below said food product supporting means for directing gas through said nozzles in said duct means to imping upon opposite sides of the food product on said supporting means, means to move said supporting means relative to said nozzles to move the food product relative to the discrete streams to move points upon which the streams impinge relative to the streams, a plenum in said chamber for enclosing a reservoir of gas, said plenum being positioned adjacent an edge of said supporting means and having said duct means connected thereto, said plenum having one side adjacent the food supporting means with openings therein in communication with said duct means and having an opposing side with an inlet opening therein, said plenum being spaced inwardly from said enclosure whereby a flow path for diffused gas in said chamber is formed above and below said plenum to allow gas to return to said inlet opening, and impeller means adapted to move gas axially and radially positioned in said chamber at said inlet opening for providing a supply of pressurized gas to said plenum from said chamber, deflector means extending longitudinally of said plenum adjacent said impeller means to direct gas into said duct means such that gas is caused to flow through said nozzles in said duct means to impinge upon said food product and once contacting said food product to diffuse and return around said plenum to said impeller means by paths which extend above and below said plenum means.

9. The impingement device according to claim 8 wherien said chamber has an inlet passage at one end and a delivery passage at the opposite end and wherein said means to move the supporting means includes a coveyor to move a food product through the inlet passage, through the chamber between the duct means, and through the delivery passage.

10. The impingement device according to claim 9 wherein said impeller means comprises a fan, said deflector means being positioned to split a stream of gas delivered by said fan to direct flow to each of said ducts.

11. An impingement apparatus for thermally treating food products comprising: a chamber for receiving a food products therein; means for supporting and moving the food product through the chamber; at least one jet finger means positioned above and at least one jet finger means positioned below the supporting and moving means, each jet finger means having therein a plurality of nozzles shaped and spaced to form a plurality of jets of gas for impingement on a discrete area of the food product;

plenum means in the chamber supporting the jet finger means above and below the supporting and moving means and having an inlet for receiving gas from the chamber and outlet openings for feeding gas to the jet finger; and impeller means positioned in the inlet of the plenum means for providing a supply of pressurized gas to said plenum means;

whereby, on operation of the impeller means and the supporting and moving means, impinging jets of gas are produced which impinge on and are moved across the surfaces of the food product for the thermal treatment thereof, the improvement being characterized in that:

the appratus is arranged such that, after impingement on the food product, the gas streams return towards the plenum means in a direction reverse to the direction of the impinging jets between the jet finger means; and the apparatus further includes a deflector being shaped and positioned relative to the impeller means to direct gas to the jet finger means.

12. The impingemnet apparatus of claim 11, wherein the support and moving means comprises a conveyor means.

13. The impingement appratus of claim 12, wherein the conveyor means is arranged in a generally horizontal passageway aligned with front and rear openings in the chamber.

14. The impingment apparatus of claim 11, further including:

a generally annular collar on the plenum means disposed around the inlet opening; and a shroud having a surface in close proximity to the collar for directing gases into the collar.

15. The impingement apparatus of claim 14, wherein the collar has a cyclindrical portion which extends axially relative to the axis of rotation of the impeller means.

16. The impingement apparatus of claim 11, wherein the impeller means comprises a generally circular plate member which has a diameter less than the diameter of the inlet opening of the plenum, a plurality of blades annularly disposed on the plate member, and means for rotating the plate member.

17. The impingement apparatus of claim 16, wherein there is an axially extending surface on the plate member.

18. The impingement apparatus of claim 11, wherein each jet finger means includes a duct which tapers in cross-section in a direction away from the plenum means.

* * * * *

UNITED STATES PATENT AND TRADEMARK OFFICE
CERTIFICATE OF CORRECTION

PATENT NO.   : 4,679,542
DATED        : July 14, 1987
INVENTOR(S)  : Donald P. Smith and Virgil L. Archer It is certified that error appears in the above-identified patent and that said Letters Patent is hereby corrected as shown below:

Col. 1, line 7, change "Plentum" to -- Plenum --
Col. 5, line 63, delete "subject"
Col. 9, line 67, change "velow" to -- below --
Col. 10, line 6, change "baldes" to -- blades --
Col. 10, line 8, change "directios" to -- directions --
Col. 10, line 38, change "imping" to -- impinge --
Col. 11, line 2, change "wherien" to -- wherein --
Col. 11, line 36, change "appratus" to -- apparatus --
Col. 12, line 21, change "cyclindrical" to -- cylindrical --

Signed and Sealed this

Twenty-second Day of December, 1987

Attest:

DONALD J. QUIGG

*Attesting Officer*   *Commissioner of Patents and Trademarks*